(12) United States Patent
Cragg et al.

(10) Patent No.: US 6,255,642 B1
(45) Date of Patent: Jul. 3, 2001

(54) STANDING WAVE TOTAL INTERNAL REFLECTION IMAGING

(75) Inventors: George Cragg, Somerville; Hyuk-Sang Kwon, Cambridge; Chen-Yuan Dong, Boston; Peter T. C. So, Cambridge, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/338,071

(22) Filed: Jun. 23, 1999

(51) Int. Cl.$^7$ .................................................. G02B 21/06
(52) U.S. Cl. ............................ 250/216; 356/376; 359/368
(58) Field of Search ............................ 250/216, 227.11, 250/234, 235; 356/136, 135, 364, 366, 367, 337, 338, 239, 445, 376, 352, 359; 359/368, 386, 396

(56) References Cited

U.S. PATENT DOCUMENTS

| | | | |
|---|---|---|---|
| 4,297,032 | * 10/1981 | Temple | 356/366 |
| 4,584,484 | 4/1986 | Hutchin . | |
| 4,621,911 | * 11/1986 | Lanni et al. | 359/386 |
| 5,394,268 | * 2/1995 | Lanni et al. | 359/386 |
| 5,538,850 | * 7/1996 | King et al. | 435/6 |
| 5,633,724 | * 5/1997 | King et al. | 356/445 |
| 5,666,197 | * 9/1997 | Guerra | 356/359 |
| 5,754,514 | * 5/1998 | Guerra | 369/116 |
| 5,774,221 | * 6/1998 | Guerra | 356/376 |
| 5,801,881 | * 9/1998 | Lanni et al. | 359/386 |
| 5,841,129 | * 11/1998 | Basca | 250/216 |
| 6,055,097 | * 4/2000 | Lanni et al. | 359/386 |

OTHER PUBLICATIONS

Abney et al., "Evanescent Interference Patterns for Fluorescence Microscopy," *Biophysical Journal,* 61:542–552, Feb. 1992.

Axelrod et al., "Total Internal Reflection Fluorescence," *Ann. Rev. Biophys. Bioeng.,* 1984, 13:247–468.

Bailey et al., "Three–Dimensional Imaging of Biological Specimens with Standing Wave Fluorescence Microscopy," pp. 415–420, Reprinted from "Three–Dimensional Microscopy . . . ", *Proc. SPIE,* 2184:208–213 (1994).

Hanninen et al., "Two–photon excitation 4Pi Confocal Micorscope: Enhanced Axial Resolution Microscope for Biological Research,"*Appl. Phys. Lett.,* 66:1698–1700, Mar. 27, 1995.

Hwang et al., "Fabrication of Large Area Nanostructured Magnets by Interferometric Lithography," *Transactions on Magnetics,* 34:1087–1089, Jul., 1998.

(List continued on next page.)

*Primary Examiner*—John R. Lee
(74) *Attorney, Agent, or Firm*—Fish & Richardson P.C.

(57) ABSTRACT

The invention features a microscopy system for imaging a sample including: a substantially transparent optical block having an interface for positioning the sample adjacent the interface; a light source which during operation overlaps at least two optical beams at the interface, the source directing the beams into the block towards the interface at incident angles that cause the beams to reflect from the interface and establish an evanescent standing wave of electromagnetic energy that extends away from the interface and into the sample; and a detector which during operation records an image of the sample based on optical radiation emitted from the sample in response to the evanescent standing wave. The invention also features a method for determining a high-resolution image of a sample including: coupling an evanescent standing wave of electromagnetic energy into the sample; recording an image of the sample based on radiation emitted from the sample in response to the evanescent standing wave for each of multiple positions of the standing wave; and constructing the high-resolution image based on the multiple recorded images.

21 Claims, 6 Drawing Sheets

OTHER PUBLICATIONS

Nesnidal et al., "Multilayer Dielectric Structure for Enhancement of Evanescent Waves," *Applied Optics,* 35:2226–2229, May 1, 1996.

Olveczky et al., "Mapping Fluorophore Distributions in Three Dimensions by Quantitave Multiple Angle–Total Internal Reflection Fluorescence Microscopy," *Biophysical Journal,* 73:2836–2847, Nov. 1997.

Tien et al., "Theory of Prism–Film Coupler and Thin–Film Light Guides," *Journal of the Optical Society of America,* 60:1325–1337, Oct. 1970.

Zaidi et al., "Multiple–Exposure Interferometric Lithography," *J. Vac. Sci. Technol. B.,* 11:658–666, May/Jun. 1993.

* cited by examiner

STANDING WAVE TOTAL INTERNAL REFLECTION IMAGING

This invention was made with government support under Grant Number MCB9604382 awarded by the National Science foundation. The government has certain rights in the invention.

BACKGROUND OF THE INVENTION

The invention relates to methods and systems for obtaining high-resolution images of microscopic samples including, for example, biological specimens and novel materials.

Obtaining images of microscopic phenomena has long been a crucial aspect of research in biomedical and material science. To improve such research, there has been ongoing study to improve the resolution of imaging techniques along both axial and lateral directions. Existing techniques include far-field techniques such as conventional optical microscopy, confocal microscopy, and two-photon fluorescence microscopy, and near-field techniques such as near-field scanning optical microscopy (NSOM), scanning tunneling microscopy (STM), and atomic force microscopy (AFM).

SUMMARY OF THE INVENTION

The invention features an optical microscopy method and system that can obtain high-resolution images of a sample along both axial and lateral directions with relatively rapid acquisition times. The method and system involve coupling an evanescent standing wave into the sample and recording an image of optical radiation emitted from the sample in response to the evanescent standing wave for each of multiple positions of the standing wave. The evanescent standing wave can be produced by totally internally reflecting two counter-propagating beams from an interface of an optically dense substrate adjacent the sample. Selecting portions of each of the recorded images corresponding to the peaks of the evanescent standing wave and combining the selected portions can produce a high-resolution image. The lateral resolution is comparable to the half-width of the peaks in the evanescent standing wave, which is inversely related to the refractive index of the optically dense substrate. We refer to the technique of the invention as Standing Wave Total Internal Reflection (SWTIR) Imaging.

In general, in one aspect, the invention features a microscopy system for imaging a sample. The system includes a substantially transparent optical block having an interface for positioning the sample adjacent the interface; a light source which during operation overlaps at least two optical beams at the interface; and a detector. During operation, the light source directs the beams into the block towards the interface at incident angles that cause the beams to reflect from the interface and establish an evanescent standing wave of electromagnetic energy that extends away from the interface and into the sample. During operation, the detector records an image of the sample based on optical radiation emitted from the sample in response to the evanescent standing wave.

The microscopy system can include any of the following features. The evanescent standing wave can have a period less than the wavelength of the optical beams. The at least two beams can include four beams and the evanescent standing wave can extend along both lateral dimensions. The light source can include a laser and a mirror, wherein the laser directs a first of the at least two beam to the interface, the interface reflects the first beam to define a reflected beam, and the mirror retroreflects the reflected beam back to the interface to define a second of the at least two beams. The optical block can be homogeneous or it can include multiple layers and/or multiple coatings. Suitable materials for the optical block can include fused quartz, gallium phosphide, tellerium oxide, and flint glass. The detector can include a microscope objective, relay optics, and a CCD camera. The microscope objective can be positioned on the same side of the optical block as the interface, or on the opposite side.

Furthermore, the microscopy system can include a controller which during operation causes the optical source to vary the incident angles of the optical beams and thereby vary the depth to which the evanescent standing wave extends into the sample.

The microscopy system can also include a controller which during operation causes the light source to translate the position of the evanescent standing wave established by the reflected beams, causes the detector to record an image of the sample for each of multiple positions of the standing wave, and determines a high-resolution image of the sample based on the multiple images recorded by the detector. During operation the controller can further cause the optical source to vary the incident angles of the optical beams, determine a high-resolution image of the sample for each of the incident angles, and construct an axially resolved high resolution image of the sample based on the determined high-resolution images.

In general, in another aspect, the invention features a method for determining a high-resolution image of a sample including: coupling an evanescent standing wave of electromagnetic energy into the sample; recording an image of the sample based on radiation emitted from the sample in response to the evanescent standing wave for each of multiple positions of the standing wave; and constructing the high-resolution image based on the multiple recorded images.

The method can include any of the following features. The constructing step can include: selecting from each recorded image portions of the recorded image; and combining the selected portions to construct the high-resolution image. The selected portions for each recorded image can be intensity values corresponding to the peaks of the standing wave. The evanescent standing wave can extend along one or two dimensions. The radiation emitted from the sample can be fluorescence or scattered radiation.

Furthermore, the coupling step can include: positioning the sample adjacent an interface of an optical block; and totally internally reflecting at least two counter-propagating beams from the interface. The coupling step can also include coupling a first one-dimensional evanescent standing wave along a first axis in the sample plane and separately coupling a second one-dimensional evanescent standing wave along a second axis in the sample plane, in which case the recording step includes recording images for each of multiple positions of each standing wave.

In another aspect, the invention features a method for determining an axially resolved high-resolution image of a sample. The method includes determining a lateral high-resolution image of the sample using the first-mentioned method for each of multiple penetration depths of the evanescent standing wave; and constructing the axially-resolved high resolution image from differences between the determined lateral high-resolution images.

Embodiments of the invention have many advantages. For example, the resolution along the lateral direction can be better than λ/13, where λ is the wavelength of the excitation light producing the evanescent standing wave. Such lateral resolution can be further improved by using nonlinear imaging modalities such as two photon excitation and pump-probe. The imaging light is confined along the axial direction to within the skin depth of the evanescent wave, e.g., on the order of 50 to 100 nm, thereby eliminating out of focus light that would wash out the in-plane resolution.

Furthermore, images can be constructed that section the sample along the axial direction by processing multiple images in which the evanescent standing wave penetrates into the sample to different depths. As a result, high-resolution images can be constructed along three dimensions.

The lateral image acquisition rates can also be very fast, comparable to, or faster than, video rates. Moreover, the optical technique is non-invasive, requiring no mechanical contact between the sample and a probe. Thus, the technique can be easily applied to soft biological samples.

Other features and advantages will be apparent from the following detailed description and from the claims.

DETAILED DESCRIPTION

Figure 1:
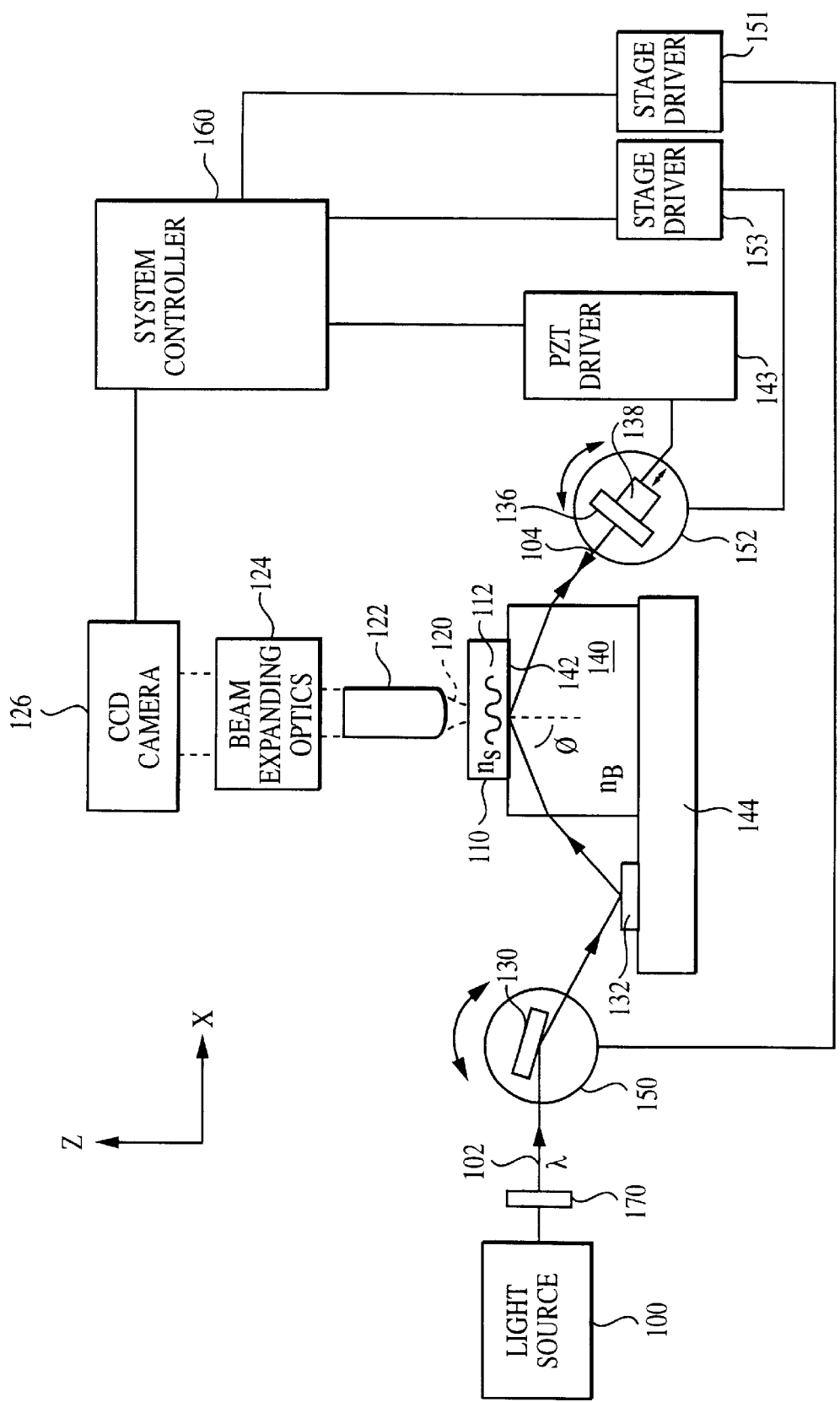
FIG. 1 is a schematic diagram of a high-resolution imaging system.

One embodiment of the standing wave total internal reflection imaging system is shown schematically in FIG. 1. A series of optics directs excitation light from a coherent light source 100, such as a laser, to couple an evanescent standing wave 112 of the excitation light into a sample 110. The excitation light in the evanescent standing wave causes optical emission 120 from sample 110, which is imaged by a microscope objective 122 and relay optics 124 onto an image plane of a CCD camera 126 that records the image.

Sample 110 can be a film of biological material, a patterned material, or any material having microscopic features to be imaged. In some embodiments, the wavelength of the excitation light produced by light source 100 is selected to induce fluorescence from selected chromophores in sample 110 in response to evanescent standing wave 112. The induced fluorescence thus forms optical emission 120. In other embodiments, the excitation light in evanescent standing wave 112 is scattered by selected sites, e.g., refractive index inhomogeneities, in sample 110, which convert the evanescent electromagnetic energy into optical emission 120. In either of these embodiments, features of interest in sample 110 can inherently have the chromophoric or scattering properties, or alternatively, the features of interest can be tagged with suitable chromophores or scatterers during sample fabrication so that the recorded images are indicative of the features of interest.

The system generates evanescent standing wave 112 in sample 110 as follows. Light source 100 directs an excitation beam 102 to a directing mirror 130 supported by an angular rotation and translation stage 150. Directing mirror 130 then directs excitation beam 102 to another mirror 132, which in turn directs excitation beam 102 into a substantially transparent, optically dense block 140 having a refractive index $n_B$ and an interface 142 adjacent sample 110. Suitable materials for block 140 include, for example, quartz, gallium phosphide, tellurium oxide, and flint glass. A translation stage 144 supports block 140 and mirror 132 and positions sample 110 relative to microscope objective 122. The angular orientation of rotation stage 150 (and hence directing mirror 130) causes excitation beam 102 to contact interface 142 within block 140 at an incident angle θ. Note also that excitation beam 102 is refracted upon entering optical dense block 140. The incident angle θ is selected to satisfy the expression $\sin θ \geq n_S/n_B$, where $n_s$ is the refractive index of the sample and $n_S < n_B$, thereby causing excitation beam 102 to totally internally reflect from interface 142. Thereafter, excitation beam 102 exits block 140 and contacts a third mirror 136. Another angular rotation stage 152 supports mirror 136 and orients it normal to excitation beam 102. As a result, excitation beam 102 retroreflects from mirror 136 to form a counter-propagating beam 104, which returns to interface 142 where it is also totally internally reflected by the interface. As described below, the interference between totally internally reflected counter-propagating beams 102 and 104 generate evanescent standing wave 112 in sample 110.

Upon totally internally reflecting from interface 142, energy from each of counter-propagating beams 102 and 104 penetrate through interface 142 and into sample 110 to establish counter-propagating evanescent surface waves. The intensity of the evanescent surface waves decay exponentially along the normal to the ignterface (defined as the z-coordinate) as exp(−z/d), where d is referred to as the "skin depth" and is given by $$d = \frac{\lambda}{4\pi}[n_B^2\sin^2\theta - n_S^2]^{-1/2},$$

and where λ is the wavelength of the excitation light in vacuum. Individually, the evanescent surface waves propagate in opposite directions parallel to interface 140 with a wavelength equal to $\lambda/(n_B\sin θ)$. Together, the interference between the two evanescent surface waves produces evanescent standing wave 112 having an intensity distribution I(x,z) given by:

$$I(x,z)=I_0\exp(-z/d)\cos^2[2\pi(n_B\sin θ/\lambda)(x-x_0)] \quad (1),$$

where $x_0$ defines a reference position for the evanescent standing wave. Adjusting the relative phase of counter-propagating beams 102 and 104 can shift the reference position $x_0$. In particular, a piezoelectric transducer 138 attached to mirror 136 causes the mirror to translate parallel to the direction of beam 102 and 104 in response to a signal from a transducer driver 143. A translation of mirror 136 by an amount equal to λ/2 causes the reference position $x_0$ to shift by a full wavelength of the evanescent standing wave, i.e., by $\lambda/(2n_B\sin θ)$.

As described above, evanescent standing wave 112 induces optical emission 120 from sample 110 that is then imaged by microscope objective 122 and relay optics 124 onto CCD camera 126, which records the image. A system controller 160 connects to CCD camera 126 and stores the images recorded by CCD camera 126. Furthermore, system controller 160 connects to transducer driver 143 and causes it to translate mirror 136 and thereby shift the position of evanescent standing wave 112. For example, system controller 160 can cause the reference position $x_0$ of evanescent standing wave 112 to shift through N equally spaced intervals that span a full period of the evanescent standing wave. In such a case, system controller 160 causes mirror 136 to translate in intervals of $\lambda/2N$ and thereby causes evanescent standing wave 112 to shift position in intervals of $\lambda/(2Nn_B\sin\theta)$. For each position of the evanescent standing wave, system controller 160 stores the image recorded by CCD camera 126. As described in greater detail further below, system controller 160 selects portions of the recorded images and combines the selected portions to construct a high-resolution image of sample 110. System controller 160 can be a computer or a preprogrammed electronic circuit having suitable I/O interfaces for the respective devices.

System controller 160 also connects to stage drivers 151 and 153, which electronically control the position and orientation of angular rotation stages 150 and 152, respectively. Controller 160 can cause stage driver 151 to orient mirror 130 to cause excitation beam 102 to contact interface 142 at each of multiple incident angles $\theta_i$, and cause stage driver 153 to orient mirror 136 to be normal to excitation beam 102 for each of the multiple incident angles $\theta_i$. As described in greater detail further below, constructing a high-resolution image for each of multiple incidence angles permits sectioning of sample 110 along the axial direction because evanescent standing wave 112 penetrates into the sample to different skin depths.

Figure 2:
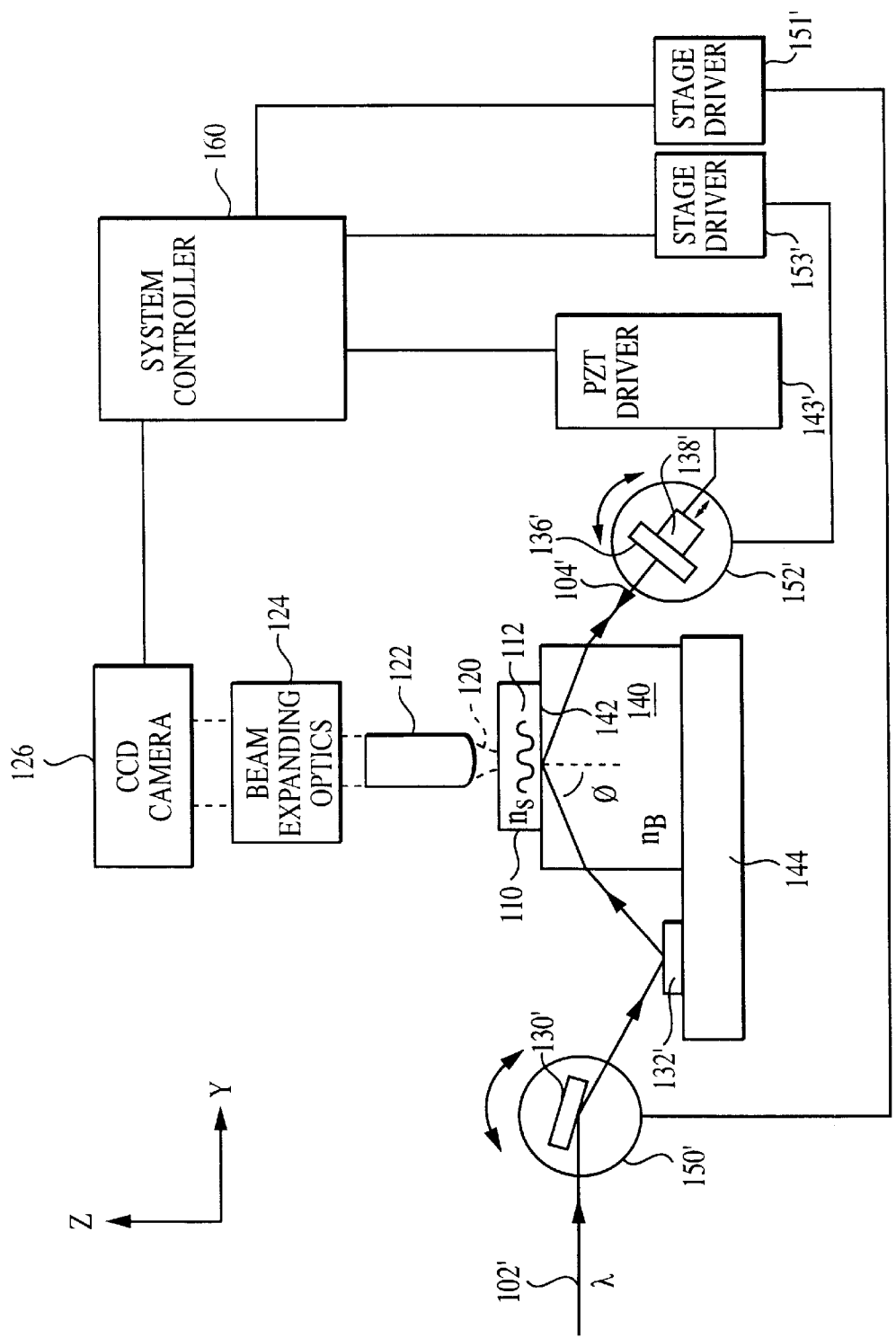
FIG. 2 is a schematic diagram of the system of FIG. 1 in plane perpendicular to that of FIG. 1.

The microscopy system shown in FIG. 1 also includes additional components that cause the evanescent standing wave to also be formed along the second lateral dimension perpendicular to the plane of FIG. 1. In particular, beam splitting optic 170 splits a portion of excitation beam 102 to form excitation beam 102' and directs excitation beam 102' to a mirror (not shown) that in turn directs it to the series of optics shown in FIG. 2. FIG. 2 depicts the microscopy system in a plane perpendicular to that of FIG. 1 and parallel to the z-axis of FIG. 1 (i.e., the y-z plane), and includes additional features denoted by primed reference numerals that are identical to those described in FIG. 1 for corresponding non-primed reference numerals. In particular, mirrors 130' and 132' direct excitation beam 102' to contact interface 142 at an incident angle $\theta$ with respect to the y-z plane and mirror 136' retroreflects excitation beam 102' to form counter-propagating beam 104'. Beams 102' and 104' interfere with one another at interface 142 to produce a standing wave modulation in evanescent standing wave 112 along the y-axis. Furthermore, piezoelectric transducer 138' in response to driver 143' can translate mirror 136' to shift the reference position $y_0$ of evanescent standing wave 112 along the y-axis. System controller 160 controls driver 143' and also controls drivers 151' and 153' to orient angular rotation stages 150' and 152' for each of multiple incident angles $\theta_i$ with respect to the y-z plane. Thus, the intensity distribution I(x,y,z) for evanescent standing wave 112 is given by:

$$I(x,y,z)=I_{00}\exp(-z/d)\{\cos^2[2\pi(n_B\sin\theta/\lambda)(x-x_0)]+\cos^2[2\pi(n_B\sin\theta/\lambda)(y-y_0)]\} \quad (2).$$

In other embodiments, rather than being equal as described above, the incident angles in the x-z and y-z planes can differ.

All of the components shown in FIGS. 1 and 2 are standard optical components, known to those of ordinary skill in the art. For example, the rotation stages, piezoelectric transducers, and corresponding electronic drivers can be obtained from companies such as Polytech PI Inc. (Auburn, Mass.) and Queensgate Instruments Ltd. (East Meadow, N.Y.). Furthermore, the respective optical components can be secured to an optical breadboard or another such support structure. The light source can be any coherent source, for example, a laser such as a solid-state laser, a diode laser, a CW frequency-doubled Nd:YAG laser, and a HeNe laser.

A mathematical description of the images recorded by CCD camera 126 and the subsequent processing performed by system controller 160 will now be described. For simplicity, the mathematical description will be limited to only one lateral dimension. Also, we will assume that the evanescent standing wave induces fluorescence from a distribution $\tilde{c}(x,z)$ of chromophores in the sample and it is the chromophore distribution that is the quantity of interest. As described above, in other embodiments the quantity of interest can be a distribution of scatters, e.g., refractive index inhomogeneities.

Based on Equation 1, optical emission 120 induced by evanescent standing wave 112 has an intensity distribution $I_{sp}(x;x_0)$ in the sample plane given by:

$$I_{sp}(x;x_0)=I_{00}c(x)\cos^2[2\pi(n_B\sin\theta/\lambda)(x-x_0)] \quad (3),$$

where $c(x)$ is the aggregate lateral distribution of chromophores in the sample thickness into which the evanescent standing wave penetrates. More specifically, $$c(x) = \int_0^\infty \tilde{c}(x,z)\exp(-z/d)\,dz. \quad (4)$$

Note also that the intensity distribution $I_{sp}(x;x_0)$ is parameterized by the reference position $x_0$ of the evanescent standing wave.

For many applications, determination of the aggregate lateral distribution $c(x)$, rather than $\tilde{c}(x,z)$, is sufficient because it corresponds to optical emission from a relative thin axial slice of the sample, i.e., an axial slice having a thickness on the order of the skin depth d of the evanescent standing wave. Thus, the image of optical emission $I_{sp}(x;x_0)$ recorded by CCD camera 126 has an axial resolution on the order of d, which is typically about 50 to 100 nm.

The lateral resolution of the image $I_{CCD}(\eta;x_0)$ on CCD camera 126, however, is still limited by the point spread function psf(r) of the imaging optics according to:

$$I_{CCD}(\eta;x_0) = \frac{1}{\gamma^2}\int_{-\infty}^\infty I_{sp}(x;x_0)psf(\eta-\gamma x)\,dx, \quad (5)$$

where $\eta$ is the lateral coordinate in the plane of the CCD camera, x is the coordinate in the sample plane, and $\gamma$ is the magnification factor going from the sample plane to the plane of the CCD camera. Note that for a lens have a numerical aperture of NA, $psf(r)=[2J_1(2\pi NAr/\lambda)/(2\pi NAr/\lambda)]^2$, where $J_1$ is the first order Bessel function, the wavelength $\lambda$ is that of the light being imaged, and r is a radial coordinate. Also, because CCD camera 126 records the image using discrete pixels, the image recorded by the CCD camera, $I_R(n\delta;x_0)$, is expressed as:

$$I_R(\eta\delta; x_0) = \frac{1}{\gamma^2} \int_{n\delta-\delta/2}^{n\delta+\delta/2} \int_{-\infty}^{+\infty} I_{sp}(x; x_0) psf(\eta - \gamma x) dx d\eta \quad (6)$$

where $I_R(n\delta;x_0)$ represents a matrix of values corresponding to the pixel index n and $\delta$ is the pixel width. As is apparent from Equations 4 and 5, the image on the CCD camera will correspond to an image of the lateral distribution of chromophores weighted by the evanescent standing wave and then convolved with the point spread function of the imaging optics.

Figure 3:
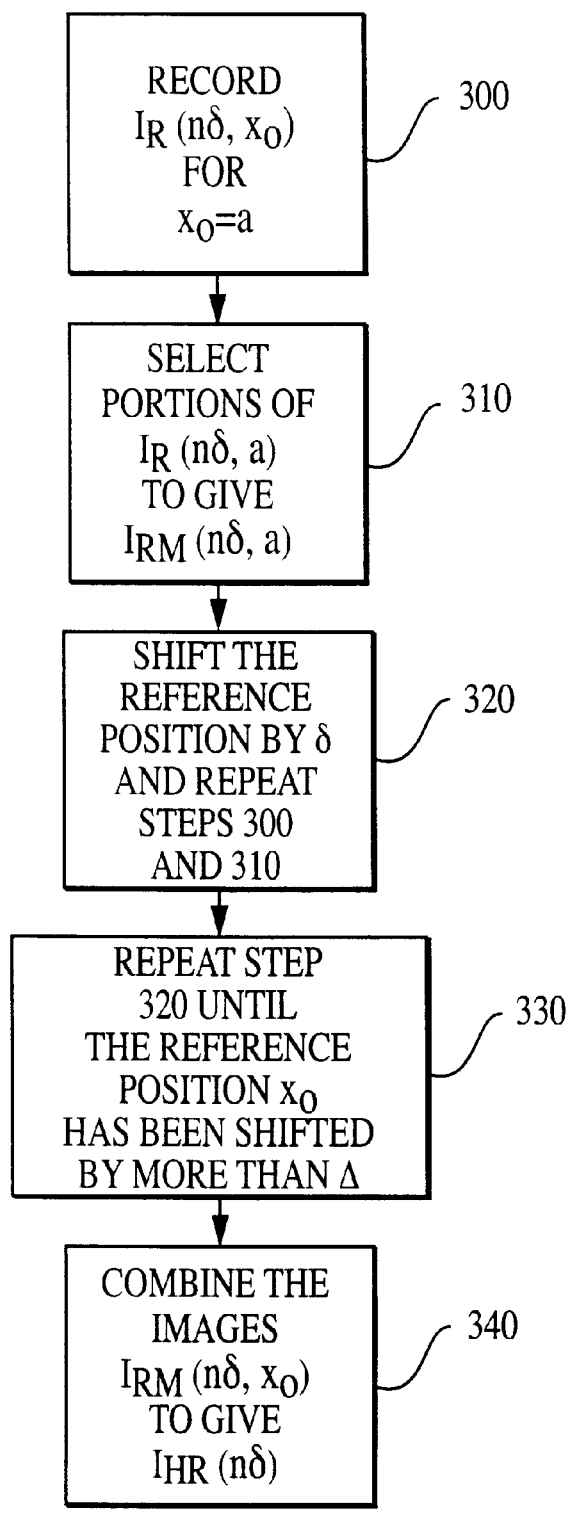
FIG. 3 is a flow chart of steps for determining a high-resolution image from multiple images recorded by the system of FIGS. 1 and 2.

To construct a high-resolution image from images recorded by CCD camera 126, system controller 160 performs the following steps, as illustrated in the flow chart of FIG. 3. In the first step (step 300), system controller 160 causes CCD camera 126 to record a first image $I_R(n\delta;\alpha)$ corresponding to an arbitrary reference position $x_0=\alpha$. In the next step (step 310), system controller 160 modifies image $I_R(n\delta;\alpha)$ to retain the intensity values of those pixels corresponding to the peaks of the evanescent standing wave and sets the intensity values for the remaining pixels equal to zero. Mathematically, the modified image $I_{RM}(n\delta;\alpha)$ can be determined by:

$$I_{RM}(n\delta; x_0) = \begin{cases} I_R(n\delta; x_0) & \text{if } n\delta - \delta/2 \le \gamma x_0 + m\gamma\Delta < n\delta + \delta/2, \\ & \text{for some integer } m, \\ 0 & \text{otherwise.} \end{cases} \quad (7)$$

where $\Delta$ equals the distance between the peaks of the evanescent standing wave, i.e., $\Delta=\lambda/(2n_B\sin\theta)$. By modifying $I_R(n\delta;\alpha)$ in this way, system controller 160 selects portions of $I_R(n\delta;\alpha)$, which, as described in the subsequent steps, will be combined with selected portions of recorded images having different reference positions to construct the high-resolution image.

In the next step (step 320), system controller 160 causes piezoelectric driver 143 to translate mirror 136 to change the reference position $x_0$ of the evanescent standing wave in the sample plane so that in the image plane the points corresponding to the peaks of the standing wave shift by $\delta$, the pixel width. As a result, the pixel positions corresponding to the evanescent standing wave peaks are shifted by one. System controller 160 then repeats steps 300 and 310 using the new reference position.

Thereafter (step 330), system controller 160 repeats step 320 for additional shifts of the reference position $x_0$ until the reference position has been shifted by an amount greater than or equal to $\Delta$, in which case additional shifts would provide redundant data because of the periodicity of the evanescent standing wave. To precisely control the reference position of the evanescent standing wave with respect to the camera pixels in the previous steps, system controller 160 can store calibration data for a reference sample having a homogeneous chromophore distribution. Such calibration data can provide a correlation between the pixel positions of the imaged peaks of the evanescent standing wave and the signal to piezoelectric driver 143 that controls the reference position $x_0$.

In the last step (step 340), system controller 160 combines the selected portions of each of the recorded images to construct the high-resolution image $I_{HR}(n\delta)$ according to:

$$I_{HR}(n\delta) = \sum_{k=0}^{j} I_{RM}(n\delta; a + k\delta) \quad (8)$$

where the integer j satisfies $\Delta/\delta \le j < (\Delta/\delta)+1$. Equation 8 simplifies to:

$$I_{HR}(n\delta) = \frac{1}{\gamma^2} \int c(x) PSF(n\delta - \gamma x) dx \quad (9)$$

where PSF(x) defines the point spread function for the technique of the present invention, i.e., the standing wave total internal reflection (SWTIR) technique:

$$PSF(x) = \cos^2[(2\pi n_B x \sin\theta)/\lambda] \int_{x-\delta/2}^{x+\delta/2} psf(\eta) d\eta. \quad (10)$$

Figure 4:
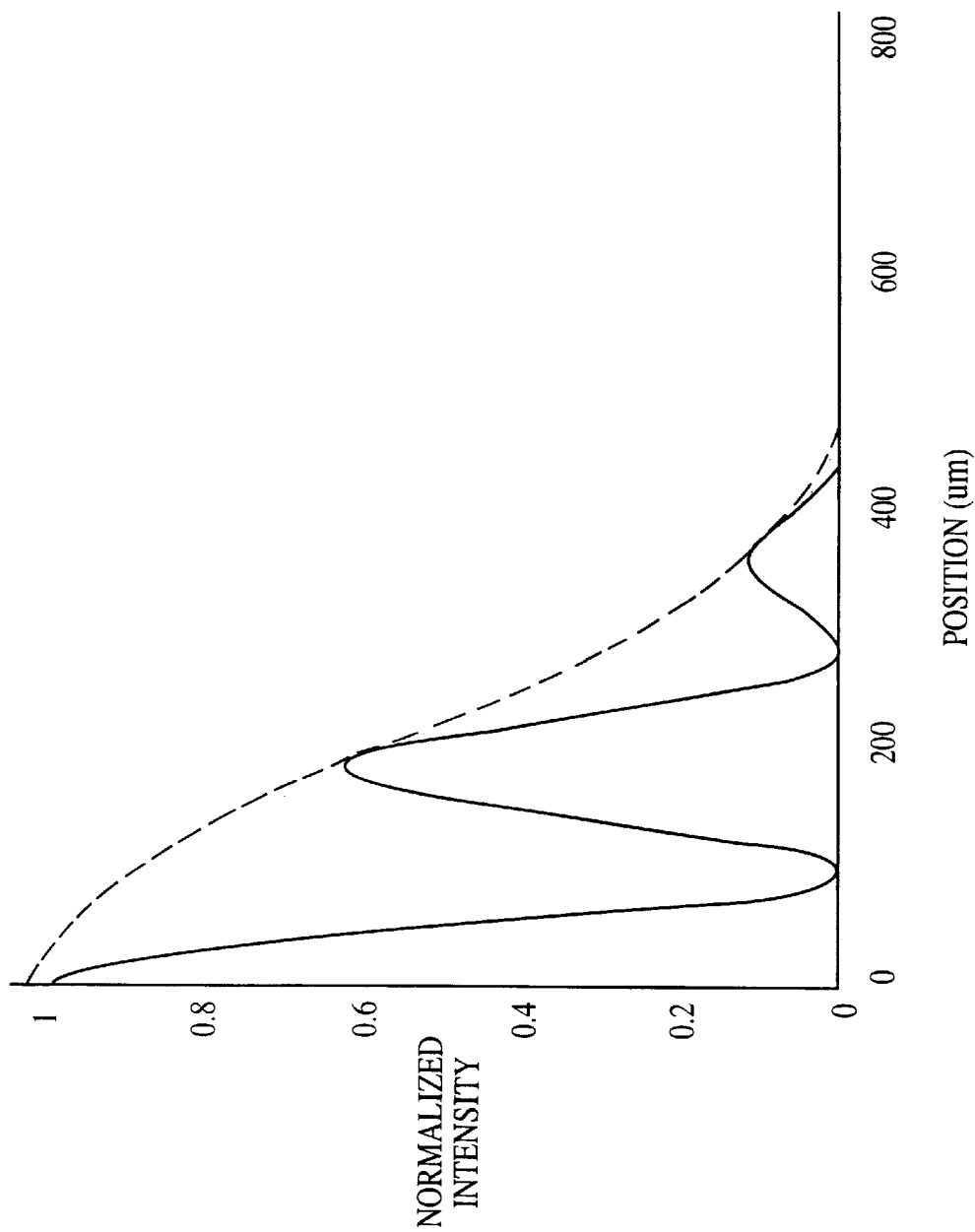
FIG. 4 is a graph illustrating the effective point spread function of the imaging technique according to the flow chart of FIG. 3.

The integral in Equation 10 corresponds to the lateral resolution provided by the microscope objective and the discrete nature of the CCD camera, which corresponds to the lateral resolution of conventional imaging. Equation 10 shows that the SWTIR technique improves the lateral resolution in the constructed image $I_{HR}(n\delta)$ because the point spread function for the SWTIR technique is modulated by the term $\cos^2[(2\pi n_B x \sin\theta)/\lambda]$. Thus PSF(x) is narrowed to about the central lobe of the cosine-squared term as shown in FIG. 4, which plots PSF(x) (solid line) and psf(x) (dotted line) for representative parameters. Contributions from the side lobes of the cosine-squared term to $I_{HR}(n\delta)$ can be removed, if necessary, by numerical deconvolution techniques known in the art, see, e.g., the three-point deconvolution technique in P. E. Hanninen et al., *Appl. Phys. Lett.* 66, 1698 (1995). Accordingly, the lateral resolution res of $I_{HR}(n\delta)$ is given by the following expression according to the Rayleigh criteria:

$$res = \frac{\lambda}{4 n_B \sin\theta}. \quad (11)$$

Equation 11 indicates that the lateral resolution of the SWTIR technique increases inversely with the refractive index of the block 140. For example, if block 140 is made of gallium phosphide, which has a refractive index of about 3.4 in the visible, the lateral resolution for the STWIR technique is better than $\lambda/13$, assuming an incident angle $\theta$ of about 75°. The lateral resolution can be further improved by using nonlinear optical excitation of the sample to generate the optical emission being imaged. For example, when evanescent standing wave 112 induces optical emission from the sample via two-photon absorption, the lateral resolution is further improved by a factor approximately equal to 2.

Other algorithms can also be implemented to obtain high-resolution images from multiple images $I_R(n\delta;x_0)$ having varying reference positions $x_0$. For example, rather than constructing modified images $I_{RM}(n\delta;x_0)$ according to Equation 7, each modified image can be constructed by taking a weighted average of the intensities of adjacent pixels of $I_R(n\delta;x_0)$ when the peaks of the imaged standing waves are not centered on a single pixel. Alternatively, regridding or other images processing techniques can be used to determine the intensities under the imaged peaks of the standing wave for each recorded image $I_R(n\delta;x_0)$. Furthermore, in other embodiments the shifting of the reference position $x_0$ of the evanescent standing wave in the sample plane can be different from that of steps 320 and 330. In particular, the imaged peaks in the image plane can be shifted by an interval greater or less than $\delta$, for example, the interval can be one that integrally divides the distance between the imaged peaks $\gamma\Delta$.

In general, the evanescent standing wave permits the generation of recorded images $I_R(n\delta;x_0)$ that contain information about $c(x)$ at high spatial frequencies. In addition to the reconstruction techniques described above, $c(x)$ can also be determined from the recorded images using other numerical and/or algebraic techniques. For example, $c(x)$ can be determined by discretizing it as a vector of N variables and solving for the N variables by using them to express the intensities of recorded images $I_R(n\delta;x_0)$ or each of N reference positions $x_0$.

The SWTIR technique was demonstrated for an embodiment in which block 140 was made of quartz, which has a refractive index of about 1.5 in the visible. A solution of 100-nm diameter fluorescent latex spheres was placed directly on block 140 and excited with 532-nm light. Imaging the fluorescence from the spheres using conventional optical microscopy produced images in which the spheres corresponded to Airy-like disks having a FWHM of 230 nm. When the SWTIR technique was used, however, the resolution improved by more than 100%, providing a FWHM resolution of about 115 nm, consistent with the $\lambda/5.7$ resolution predicted by Equation 11 based on the refractive index of quartz and an incident angle $\theta$ of about 75°.

The processing of recorded images by system controller 160 for a two-dimensional evanescent standing wave (as described in Equation 2) is similar to that described above in reference to the flow chart of FIG. 3. In particular, system controller 160 causes CCD camera 126 to record images for each of multiple pairs of reference positions $[x_0, y_0]$, selects the intensity values of the pixels of each of the recorded images corresponding to the imaged peaks of the evanescent standing wave, and combines the selected intensity values to construct a high-resolution image. The resulting point spread function has a resolution along both the x- and y-axes that is identical to that of Equation 11. The resolution along an axis intermediate to the x- and y-axes is greater than that given by psf(x,y), but somewhat less than that of Equation 11.

In other embodiments, a two-dimensional, high-resolution image can be constructed from two high-resolution images constructed using a one-dimensional evanescent standing wave. For example, the apparatus of FIGS. 1 and 2 can be modified so that beam-splitting optic 170 is replaced with an adjustable mirror controlled by system controller 160. The adjustable mirror directs beam 102 to form the evanescent standing wave along either the x-direction or the y-direction, but not both. When the evanescent standing wave is along the x-direction, system controller 160 constructs the high-resolution image $$I_{HR}^{(x)}(n_x\delta, n_y\delta)$$

in a manner identical to that described above with reference to the algorithm of FIG. 3, except that the pixel resolution along the y-direction is now explicit. In other words, following equations 9 and 10:

$$I_{HR}^{(x)}(n_x\delta, n_y\delta) = \frac{1}{\gamma^2}\int\int c(x, y)PSF^{(x)}(n_x\delta - \gamma x, n_y\delta - \gamma y)dxdy \quad (12)$$

where $$PSF^{(x)}(x, y) = \cos^2[(2\pi n_B x\sin\theta)/\lambda]\int_{pixel(x,y)}\int psf(\eta_x, \eta_y)d\eta_x d\eta_y. \quad (13)$$

Similarly, when the evanescent standing wave is along the y-direction, system controller 160 constructs the high-resolution image $$I_{HR}^{(y)}(n_x\delta, n_y\delta),$$

given by:

$$I_{HR}^{(y)}(n_x\delta, n_y\delta) = \frac{1}{\gamma^2}\int\int c(x, y)PSF^{(y)}(n_x\delta - \gamma x, n_y\delta - \gamma y)dxdy \quad (14)$$

where $$PSF^{(y)}(x, y) = \cos^2[(2\pi n_B y\sin\theta)/\lambda]\int_{pixel(x,y)}\int psf(\eta_x, \eta_y)d\eta_x d\eta_y. \quad (15)$$

System controller constructs the two-dimensional high-resolution image $$I_{HR}^{(x,y)}(n_x\delta, n_y\delta)$$

according to:

$$I_{HR}^{(x,y)}(n_x\delta,n_y\delta)=I_{HR}^{(x)}(n_x\delta,n_y\delta)+I_{HR}^{(y)}(n_x\delta,n_y\delta)-I(n_x\delta,n_y\delta) \quad (16)$$

where $$I(n_x\delta, n_y\delta) = \frac{1}{\gamma^2}\int\int c(x, y)psf(n_x\delta - \gamma x, n_y\delta - \gamma y)dxdy. \quad (17)$$

$I(n_x\delta,n_y\delta)$ is the image recorded without the standing wave excitation, which can be produced by not retroreflecting the excitation beam back to the sample, e.g., by blocking or misdirecting beams 104 and/or 104'. $I(n_x\delta,n_y\delta)$ is subtracted from the sum of $$I_{HR}^{(x)}(n_x\delta, n_y\delta)$$

and $$I_{HR}^{(y)}(n_x\delta, n_y\delta)$$

to remove duplicated low spatial frequency information. One advantage of this latter embodiment over that involving a two-dimensional evanescent wave excitation is that fewer images need to be recorded to construct the high-resolution image. In particular, assuming $N=\gamma\Delta/\delta$, the former embodiment involves $N^2$ recorded images whereas the latter embodiment involves only 2N+1 recorded images. In similar embodiments, rather than having separate excitation beam components for the x-axis and y-axis as shown in the apparatus of FIGS. 1 and 2, a rotation stage can be used to rotate the optical block and the sample with respect to excitation beams 102 and 104 and thereby permit generation of the one-dimensional evanescent standing wave along different axes in the sample plane.

Like the former embodiment employing a two-dimensional evanescent standing wave, the resolution of the point spread function corresponding to $$I_{HR}^{(x,y)}(n_x\delta, n_y\delta)$$

is identical that of Equation 11 along either the x-axis or y-axis, but somewhat less than that of Equation 11 along an axis intermediate to the x-axis and y-axis. To improve the resolution along such intermediate axes, the two-dimensional, high-resolution image can be constructed similarly to that described in the latter embodiment above except that it is constructed from more than two high-resolution images constructed using a one-dimensional evanescent standing wave. For example, if $$I_{HR}^{(k_i)}(n_x\delta, n_y\delta)$$

for i=1 to K denotes K high-resolution images each constructed similarly to that described above with reference to FIG. 3 for a one-dimensional evanescent standing wave oriented along an axis $k_i$ in the x-y plane, then a two-dimensional high-resolution image $$I_{HR}^{(\Sigma k_i)}(n_x\delta, n_y\delta)$$

can be constructed from the K high-resolution images according to:

$$I_{HR}^{(\Sigma k_i)}(n_x\delta, n_y\delta) = \left\{\sum_{i=1}^{K} I_{HR}^{(k_i)}(n_x\delta, n_y\delta)\right\} - (K-1)I(n_x\delta, n_y\delta). \quad (18)$$

We note that when constructing the individual high-resolution images $$I_{HR}^{(k_i)}(n_x\delta, n_y\delta)$$

from recorded images in which the standing wave is oriented along the axis $k_i$, the pixels of the CCD camera corresponding to the peaks of the standing wave can lie along a diagonal and their intensity values should selected accordingly. As the one-dimensional evanescent sjtaning waves of the K images span more axes in the x-y plane, the resolution of $$I_{HR}^{(\Sigma k_i)}(n_x\delta, n_y\delta)$$

along an intermediate axis approaches that of Equation 11.

As described above, the axial resolution of the image $I_{HR}$ constructed by system controller 160 is given by the skin depth d of the evanescent standing wave, which depends on the incident angle θ of counter-propagating beams 102 and 104 on interface 142. System controller 160, through its control of rotation stage drivers 151 and 153, can change the incident angle θ, and thereby change the thickness of the axial slice of the sample corresponding to constructed image $I_{HR}$. Furthermore, as depicted in the flow chart of FIG. 5, system controller 160 can process multiple high-resolution images corresponding to axial slices of the sample of different thickness to construct an image of the sample in both lateral and axial dimensions.

Figure 5:
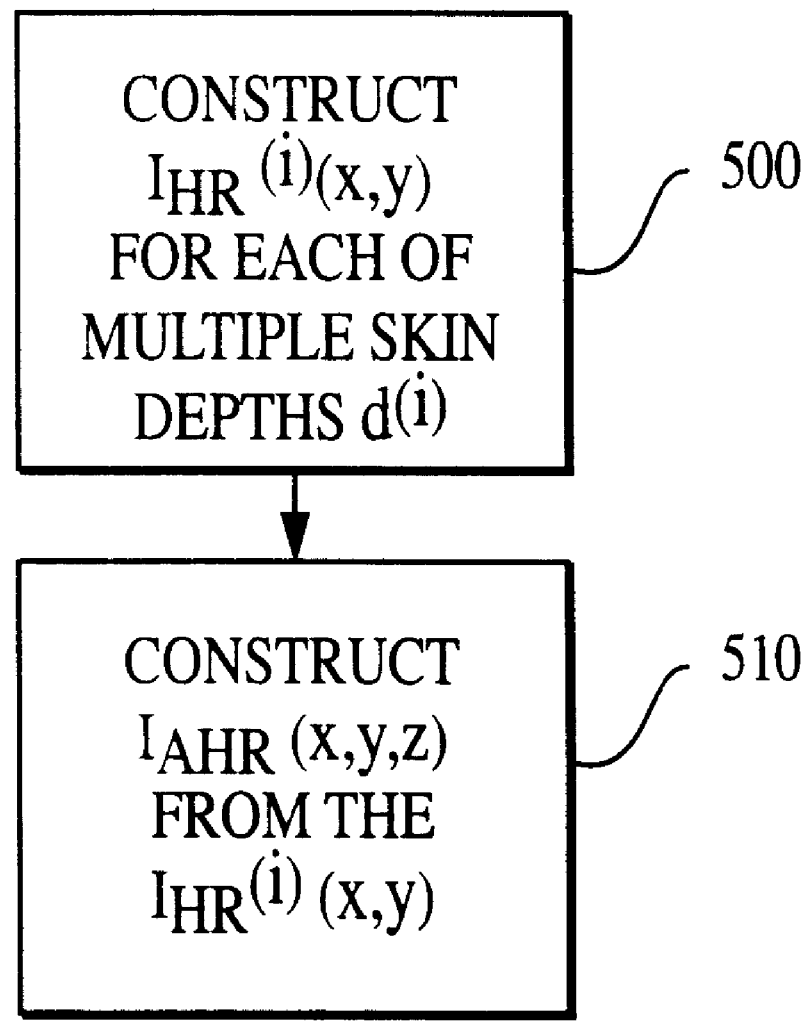
FIG. 5 is flow chart of steps for axially resolving multiple high-resolution images determined according to the flow chart of FIG. 3.

Referring to FIG. 5, in the first step (step 500), system controller 160 constructs a high-resolution image $I_{HR}^{(i)}$ for each of multiple skin depths $d^{(i)}$ of the evanescent standing wave, wherein the index i orders the skin depths $d^{(i)}$ from largest to smallest, i.e., $d^{(O)}$ corresponds to the thickest axial section. The high-resolution images $I_{HR}^{(i)}$ can be in either one or both lateral dimensions and are constructed as described above with reference to the flow chart of FIG. 3. In the next step (step 510), system controller 160 generates axially resolved high-resolution images $I_{AHR}(x,y,z)$ as:

$$I_{AHR}\left(x, y, \frac{d^{(i+1)} - d^{(i)}}{2}\right) = \frac{1}{d^{(i+1)}} I_{HR}^{(i+1)} - \frac{1}{d^{(i)}} I_{HR}^{(i)}. \quad (19)$$

The resulting three-dimensional image set approximately resolves the axial component of the chromophore distribution $\tilde{c}(x,y,z)$. In other embodiments, system controller 160 can perform more complex numerical analysis on high-resolution images $I_{HR}^{(i)}$ to more precisely resolve the axial component of chromophore distribution $\tilde{c}(x,y,z)$ using techniques known in the art such as those described by B. P. Olveczky et al., *Biophys. J.*, 73, 2836-47 (1997).

Other embodiments are also within the scope of the invention. For example, rather than imaging the optical emission induced by the evanescent standing wave through the thickness of the sample as shown in FIGS. 1 and 2, the optical emission can be imaged through the thickness of the optical block, which in this case is an optical waveguide.

Figure 6:
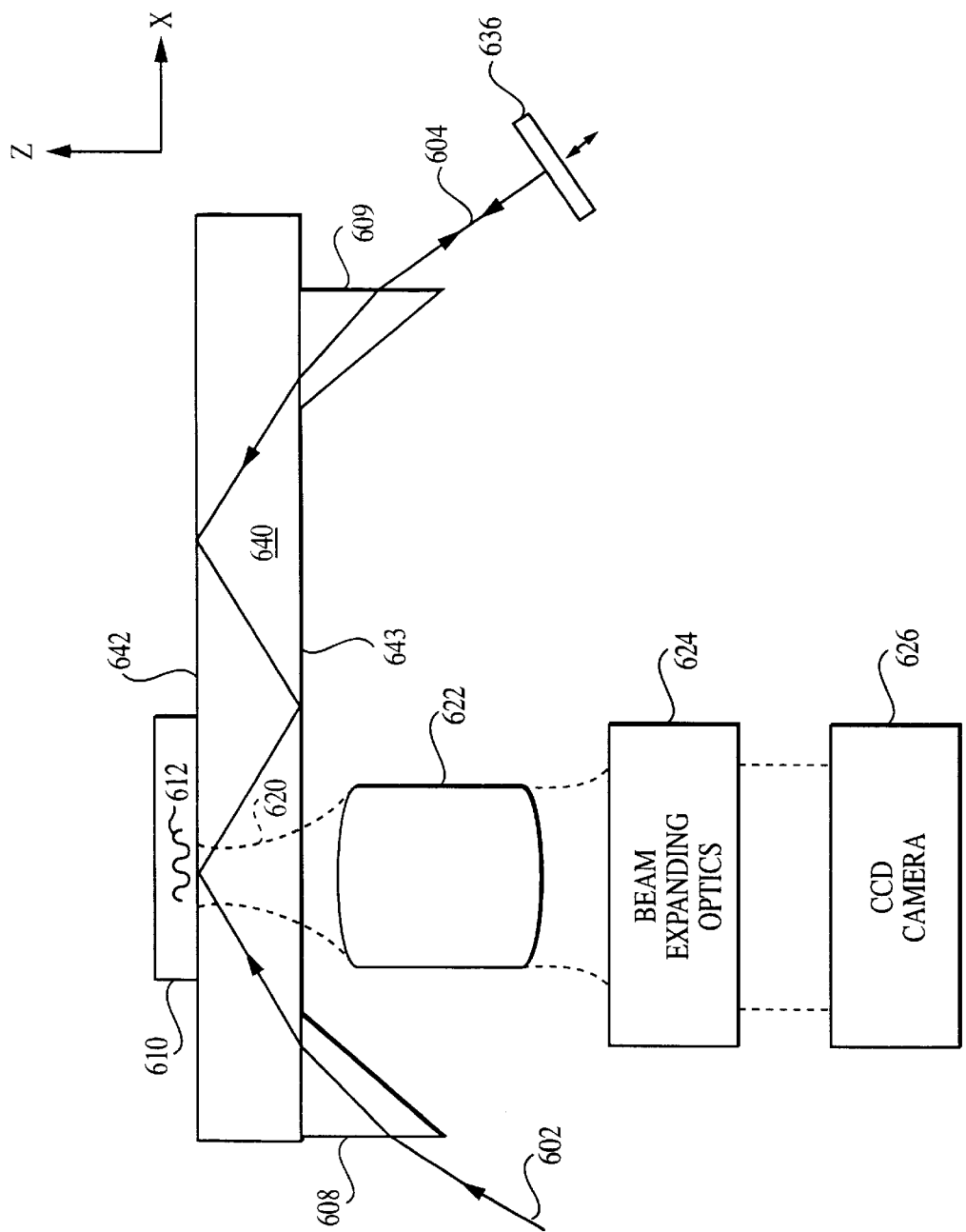
FIG. 6 is a schematic diagram of another arrangement for the high-resolution imaging system.

One such embodiment is shown in FIG. 6 in which a first coupling prism 608 couples excitation beam 602 into optical block 640. Block 640 functions as an optical waveguide with respect to the z-axis and confines excitation beam 602 within it. This is illustrated schematically in FIG. 6 by excitation beam 602 totally internally reflecting multiple times from interfaces 642 and 643 until a second coupling prism 609 couples excitation beam 602 out of the block. Mirror 636 then retroreflects excitation beam 602 to form counter-propagating excitation beam 604, which retraces the path of excitation beam 602 and also totally internally reflects from interfaces 642 and 643 because of the waveguide properties of block 640. The total internal reflection of beams 602 and 604 from interface 642 couples an evanescent standing wave 612 into a sample 610, which induces optical emission 620 from sample 610. A microscope objective 622 positioned adjacent interface 643 and subsequent relay optics 624 images optical emission 620 onto CCD camera 626, which records an image of the optical emission. Subsequent recording of additional images in which the position of the evanescent standing wave is shifted by translating mirror 636 and processing of the recorded images is the same as that described above for the embodiment of FIGS. 1 and 2. The embodiment of FIG. 6 allows the SWTIR technique to image surface and subsurface features of samples that are opaque or otherwise have internal features that could distort or corrupt the optical emission being imaged.

In further embodiments, the optical block can include multiple layers and/or multiple coatings. For example, using techniques known in the art, the optical block can include a multilayer dielectric coating that enhances the intensity of the evanescent waves in the sample, see, e.g., R. C. Nesnidal and T. G. Walker, *Applied Optics*, 35:2226–2229, 1996. Furthermore, the optical block can include a removable cover slide that is positioned on a base structure of the block and is optically coupled to the base structure by index matching fluid. Alternatively, the optical block can include an air-gap between the base structure and the cover slide, e.g., with the base structure supporting the ends but not the center of the cover slide. Arrangements with a cover slide can be useful to image biological samples that are grown directly on the cover slide. Alternatively, such biological samples can be grown directly on a homogenous optical block.

In additional embodiments, rather than retroreflecting the excitation beam to form the evanescent standing wave, two separate excitation beams derived from the same coherent source can be crossed with one another at the interface to form the evanescent standing wave. A separate modulator or delay line could be used to retard one excitation relative to the other and thereby shift the peaks of the standing wave. One advantage of this technique is that the intensities of the two excitation beams can be made equal to one another when they interfere with one another at the sample interface of the optical block. For example, in embodiments in which the optical block is a waveguide (as in FIG. 6) the intensity of the retroreflected beam can be reduced because of coupling losses into and out of the waveguide. In such cases, it can be preferable to use two separate excitation beams.

Furthermore, in any of the embodiments described above, the system controller can include hardware, software, or a combination of both to determine high-resolution and axially resolved high-resolution images. For example, the processing steps of the flow-charts of FIGS. 3 and 5 can be implemented in computer programs using standard programming techniques. Such programs are designed to execute on programmable computers each comprising a processor, a data storage system (including memory and/or storage elements), at least one input device, and least one output device, such as a display or printer. The program code is applied to input data (e.g., the recorded images from the CCD camera) to perform the functions described herein and generate output information (e.g., the high-resolution images), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the SWTIR analysis described herein.

Other aspects, advantages, and modifications are within the scope of the following claims.

What is claimed is:

1. A microscopy system for imaging a sample comprising:
    a substantially transparent optical block having an interface for positioning the sample adjacent the interface;
    a light source which during operation overlaps at least two optical beams at the interface, the source directing the beams into the block towards the interface at incident angles that cause the beams to reflect from the interface and establish an evanescent standing wave of electromagnetic energy that extends away from the interface and into the sample; and
    a detector which during operation records an image of the sample based on optical radiation emitted from the sample in response to the evanescent standing wave.

2. The microscopy system of claim 1, wherein the evanescent standing wave has a period less than the wavelength of the optical beams.

3. The microscopy system of claim 1, wherein the at least two optical beams comprise first and second beams, and wherein the light source comprises a laser and a mirror, the laser directing the first beam to the interface, the interface reflecting the first beam to define a reflected beam, and the mirror retroreflecting the reflected beam back to the interface to define the second beam.

4. The microscopy system of claim 1 further comprising a controller which during operation causes the light source to translate the position of the evanescent standing wave established by the reflected beams, causes the detector to record an image of the sample for each of multiple positions of the standing wave, and determines a high-resolution image of the sample based on the multiple images recorded by the detector.

5. The system of claim 1, further comprising a controller which during operation causes the optical source to vary the incident angles of the optical beams and thereby vary the depth to which the evanescent standing wave extends into the sample.

6. The system of claim 4, wherein during operation the controller causes the optical source to vary the incident angles of the optical beams, determines a high-resolution image of the sample for each of the incident angles, and constructs an axially resolved high resolution image of the sample based on the determined high-resolution images.

7. The system of claim 1, wherein the at least two beams comprise four beams and the evanescent standing wave extends along both lateral dimensions.

8. The system of claim 1, wherein optical block comprises fused quartz, gallium phosphide, tellerium oxide, or flint glass.

9. The system of claim 1, wherein the optical block is homogeneous.

10. The system of claim 1, wherein the detector comprises a microscope objective, relay optics, and a CCD camera.

11. The system of claim 10, wherein the microscope objective is positioned on the same side of the optical block as the interface.

12. The system of claim 10, wherein the microscope objective is positioned on the opposite side of the optical block as the interface.

13. A method for determining a high-resolution image of a sample comprising:
    coupling an evanescent standing wave of electromagnetic energy into the sample;
    recording an image of the sample based on radiation emitted from the sample in response to the evanescent standing wave for each of multiple positions of the standing wave; and
    constructing the high-resolution image based on the multiple recorded images.

14. The method of claim 13, wherein the constructing step comprises:
    selecting from each recorded image portions of the recorded image; and
    combining the selected portions to construct the high-resolution image.

15. The method of claim 14, wherein the selected portions for each recorded image are intensity values corresponding to the peaks of the standing wave.

16. The method of claim 13, wherein the coupling step comprises:
    positioning the sample adjacent an interface of an optical block, and
    totally internally reflecting at least two counter propagating beams from the interface.

17. The method of claim 13, wherein the coupling step comprises coupling a first one-dimensional evanescent standing wave along a first axis in the sample plane and separately coupling a second one-dimensional evanescent standing wave along a second axis in the sample plane, and wherein the recording step comprises recording images for each of multiple positions of each standing wave.

18. The method of claim 13, wherein the evanescent standing wave extends along two dimensions.

19. The method of claim 13, wherein the radiation emitted from the sample is fluorescence or scattered radiation.

20. A method for determining an axially-resolved high-resolution image of a sample comprising:

determining a lateral high-resolution image of the sample using the method of claim 13 for each of multiple penetration depths of the evanescent standing wave; and constructing the axially-resolved high resolution image from differences between the determined lateral high-resolution images.

21. A method for determining a high-resolution image of a sample comprising:

coupling an evanescent standing wave of electromagnetic energy into the sample; and recording an image of the sample based on radiation emitted from the sample in response to the evanescent standing wave for each of multiple positions of the standing wave.

* * * * *